(12) United States Patent
Bagley et al.

(10) Patent No.: US 10,442,609 B2
(45) Date of Patent: Oct. 15, 2019

(54) HERB KEEPER

(71) Applicant: Progressive International Corporation, Kent, WA (US)

(72) Inventors: Justin Bagley, Seattle, WA (US); Sul Gi Myoung, Federal Way, WA (US)

(73) Assignee: Progressive International Corporation, Kent, WA (US)

( * ) Notice: Subject to any disclaimer, the term of this patent is extended or adjusted under 35 U.S.C. 154(b) by 0 days.

(21) Appl. No.: 15/923,379

(22) Filed: Mar. 16, 2018

(65) Prior Publication Data

US 2018/0265278 A1 Sep. 20, 2018

Related U.S. Application Data

(60) Provisional application No. 62/472,457, filed on Mar. 16, 2017.

(51) Int. Cl.
| | |
|---|---|
| *B65D 85/50* | (2006.01) |
| *A47J 47/10* | (2006.01) |
| *B65D 81/22* | (2006.01) |
| *B65D 43/16* | (2006.01) |
| *B65D 85/52* | (2006.01) |

(52) U.S. Cl.
CPC .............. *B65D 85/50* (2013.01); *A47J 47/10* (2013.01); *B65D 43/166* (2013.01); *B65D 81/22* (2013.01); *B65D 85/52* (2013.01)

(58) Field of Classification Search
CPC ........................ B65D 25/2876; B65D 25/2873; B65D 85/50; B65D 85/52; B65D 81/22; B65D 81/18; B65D 43/166; B65D 43/163; B65D 43/16; B65D 43/164; B65D 45/16; B65D 21/0233; B65D 21/02; B65F 1/08; B65F 1/04; A47J 47/10; A47J 47/08; A47J 47/02
USPC .... 220/23.89, 9.4, 212.5, 212, 23.87, 23.86, 220/23.83, 836, 810, 324, 315, 754, 752, 220/661, 495.06, 495.08, 23.88; 206/223, 206/216, 514; 248/214, 227.4, 340
See application file for complete search history.

(56) References Cited

U.S. PATENT DOCUMENTS

| | | | | |
|---|---|---|---|---|
| 473,400 | A * | 4/1892 | Lewis | A47J 36/20 99/403 |
| 1,365,686 | A * | 1/1921 | Harvey | A61L 2/06 126/340 |
| 1,871,402 | A * | 8/1932 | Balzer | D06F 95/004 210/146 |
| 3,724,745 | A * | 4/1973 | Brown | A47C 9/007 232/43.2 |

* cited by examiner

*Primary Examiner* — Robert J Hicks
(74) *Attorney, Agent, or Firm* — Lowe Graham Jones PLLC

(57) ABSTRACT

An herb keeper includes a container having a floor and upwardly extending sidewalls forming an interior space, the sidewalls terminating in an upper rim. A lid is removably attached to the upper rim and movable between a closed position which encloses the interior space, and an open position moved away from the upper rim. A basket is configured to fit within the container and rest on the interior floor of the container. A flexible strap includes a first end attached to the interior side of the lid and a second end attached to the basket. Movement of the lid away from the container causes the strap to pull the basket upward, providing easier access to the basket.

10 Claims, 5 Drawing Sheets

HERB KEEPER

PRIORITY CLAIM

This application claims the benefit of U.S. provisional application No. 62/472,457, filed Mar. 16, 2017, the contents of which are incorporated by reference.

FIELD OF THE INVENTION

This application relates to containers for storing herbs and vegetables.

BACKGROUND OF THE INVENTION

Certain herbs and vegetables often benefit by being stored in a container that can hold a limited amount of water at the bottom of the container. The herbs and vegetables may vary in size, and therefore a relatively tall container may be useful in order to accommodate both short and long herbs. When storing relatively short herbs, however, it can be difficult to remove them from the container, or awkward to reach toward the bottom. Current storage devices are not suitable for providing ready and convenient access for stored herbs.

SUMMARY OF THE INVENTION

An herb keeper in accordance with the preferred embodiment includes a container having a floor and upwardly extending sidewalls forming an interior space, the sidewalls terminating in an upper rim. A lid is removably attached to the upper rim of the container and movable between a closed position which encloses the interior space, and an open position moved away from the upper rim, the lid having an interior side and an exterior side. A basket is configured to fit within the container and preferably to allow it to rest on the interior floor of the container. A flexible strap includes a first end attached to the interior side of the lid and a second end attached to the basket. Movement of the lid away from the container causes the strap to pull the basket upward, providing easier access to the basket.

In the preferred version, the lid is pivotally attached to the container for pivotal movement between the closed position and the open position in which the lid is pivoted away from the container.

In one version, a clasp is provided for retaining the lid in the closed position.

Preferably, the strap comprises a first strap and a second strap, the first strap having a first end attached to the interior side of the lid and a second end attached to the basket, and the second strap having a first end attached to the interior side of the lid and a second end attached to the basket.

In one example, a bar is attached to the interior side of the lid, each of the first strap and the second strap being attached to the bar.

A fastener is preferably attached to the interior side of the lid, the fastener removably attaching the bar to the interior side of the lid.

In some versions, a first mount and a first boss is attached to the first strap; a second mount and a second boss attached to the second strap; and a first grommet and a second grommet are positioned on the basket. The first boss is attached to the first grommet and the second boss is attached to the second grommet.

Preferably, a drain hole is positioned adjacent the floor of the container, and a drain plug removably seals the drain hole.

In a most preferred version the container includes a hinge, and the lid is pivotally attached to the container by the hinge. In illustrated examples, the strap is attached to the lid adjacent the hinge.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

A preferred herb keeper includes a container with a removable basket, in which the integrated basket automatically raises when a lid is opened.

Figure 1:
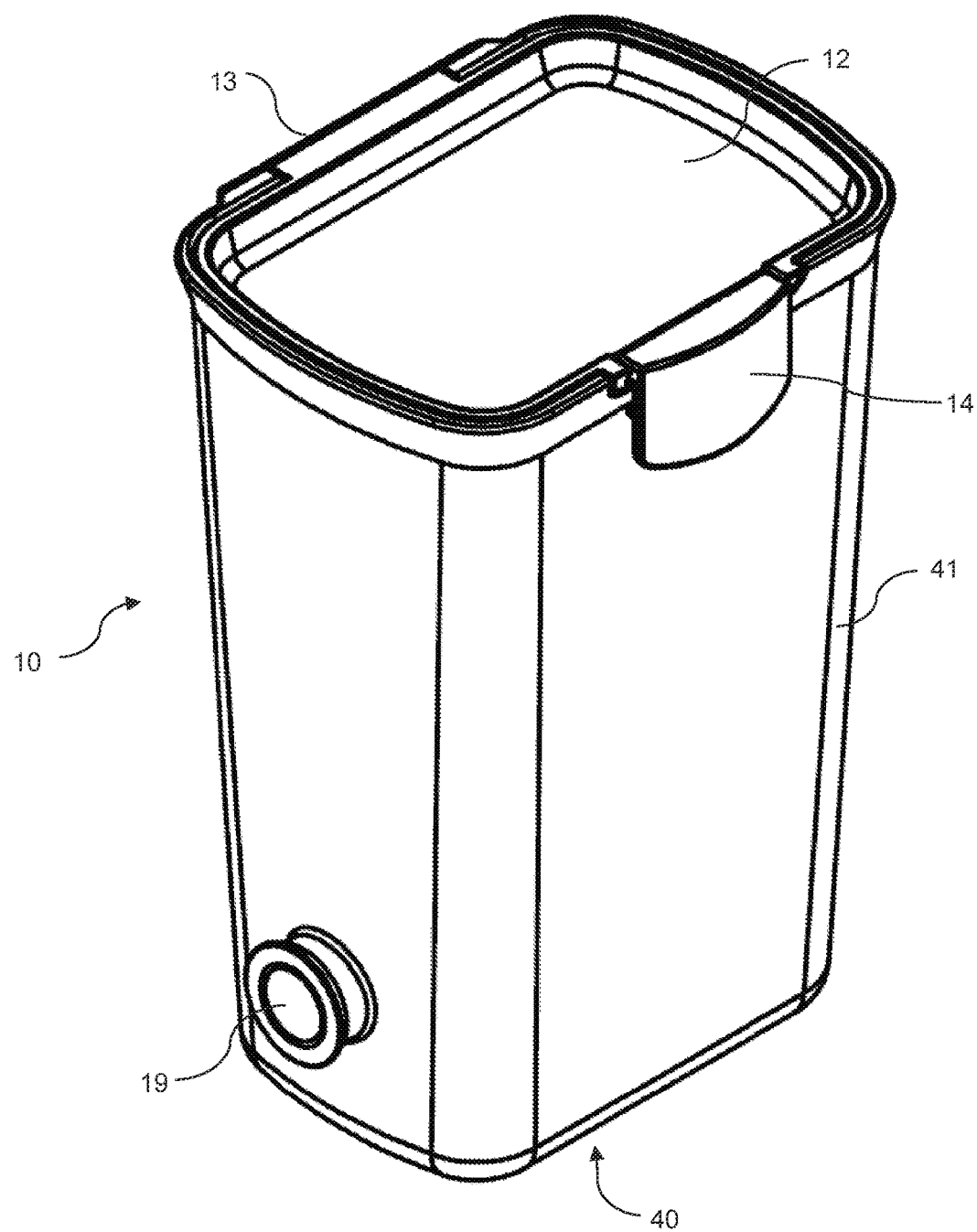
FIG. 1 is a top front perspective view of a preferred herb keeper, shown with a lid in a closed position.
Figure 2:
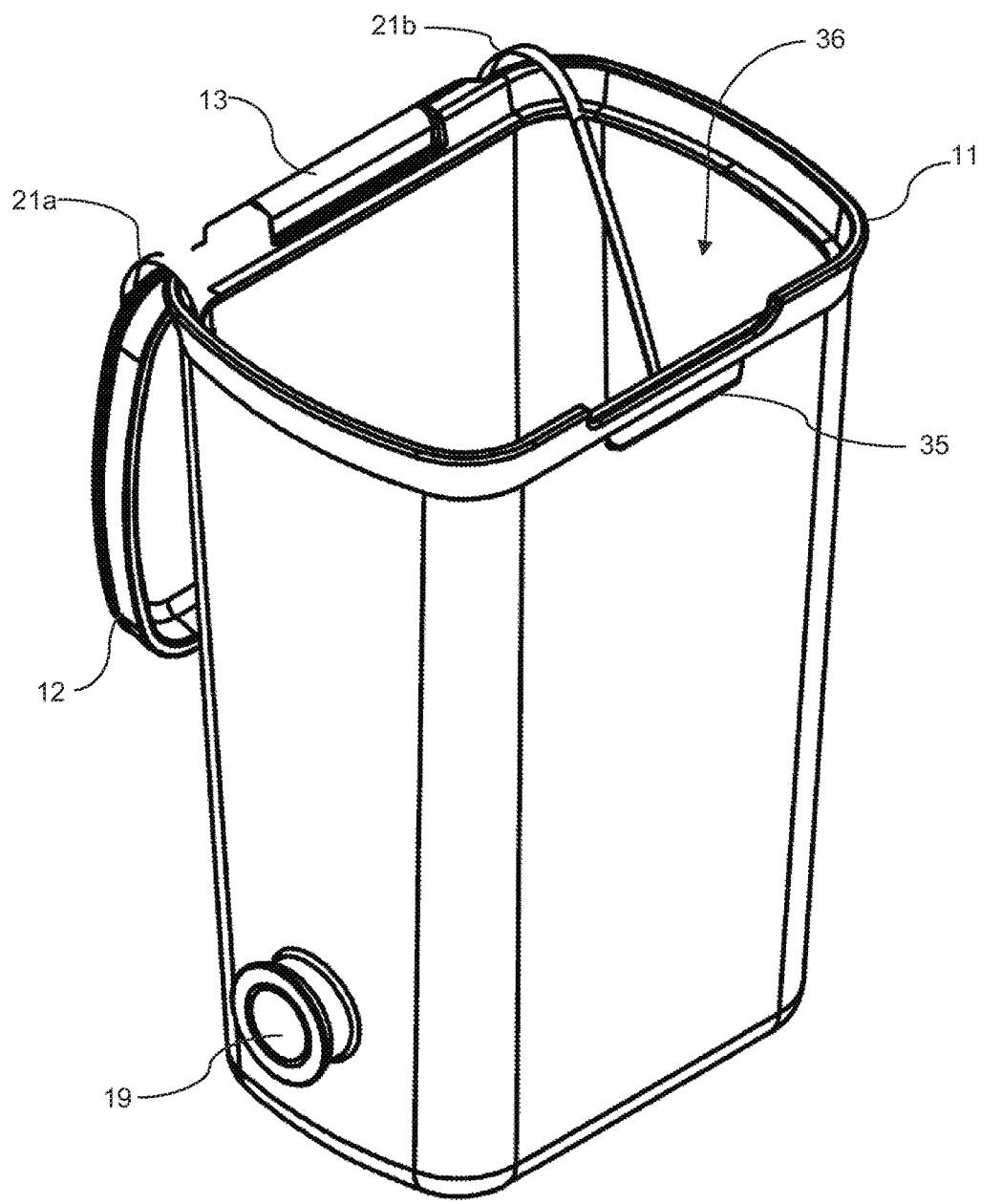
FIG. 2 is a top front perspective view of a preferred herb keeper, shown with a lid in an open position.

With reference to FIGS. 1 and 2, the herb keeper includes a container 10, preferably configured to have a floor 40 and upwardly extending sidewalls 41 which define an open interior space 36, and further in which the container is taller than its width or depth. The container may alternatively have a different shape. As illustrated, the container is formed to be water tight, and preferably made from clear santoprene or other plastic materials.

The container includes a lid 12 attached to the container by a hinge 13 so that the lid may pivot between an open position as shown in FIG. 2 and a closed as shown in FIG. 1, while the lid remains attached to the container. A clasp 14 is attached to the lid, and is configured to join with a mating feature 35 on the container to lock the lid in the closed position when the lid is closed over the upper rim 11 of the container.

Figure 3:
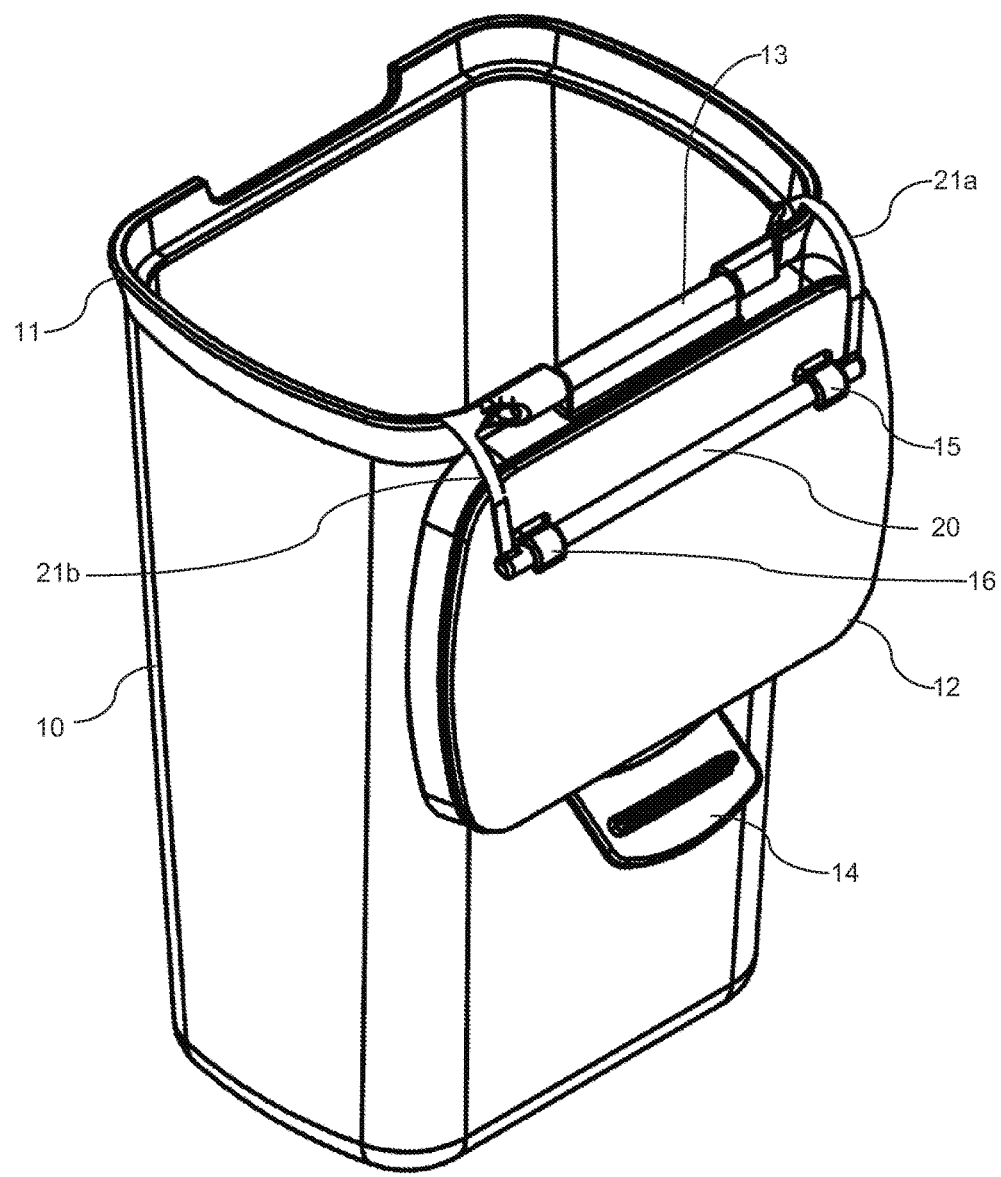
FIG. 3 is a top rear perspective view of a preferred herb keeper, shown with a lid in an open position.

With reference to FIG. 3, an interior surface of the lid 12 includes one or more fasteners 15, 16, which in the preferred version are formed as rings for receiving a cylindrical handle or bar 20. Most preferably, the handle is formed from polypropylene and is substantially rigid. In the illustrated example, the handle is configured to rotate within the fasteners, while being securely held in place by the fasteners but sufficiently loosely to allow for some rotation within the fasteners.

As indicated in the illustrated version in FIG. 3, most preferably the fasteners are located on the lid at a position relatively closer to the hinge than to the clasp. In other versions the fasteners may be moved closer to the clasp end of the lid. In general, the position of the fasteners as between the hinge end and the clasp end will determine the length of travel of the straps when the lid is opened, and thereby the height to which the basket is raised when the lid is opened.

Figure 4:
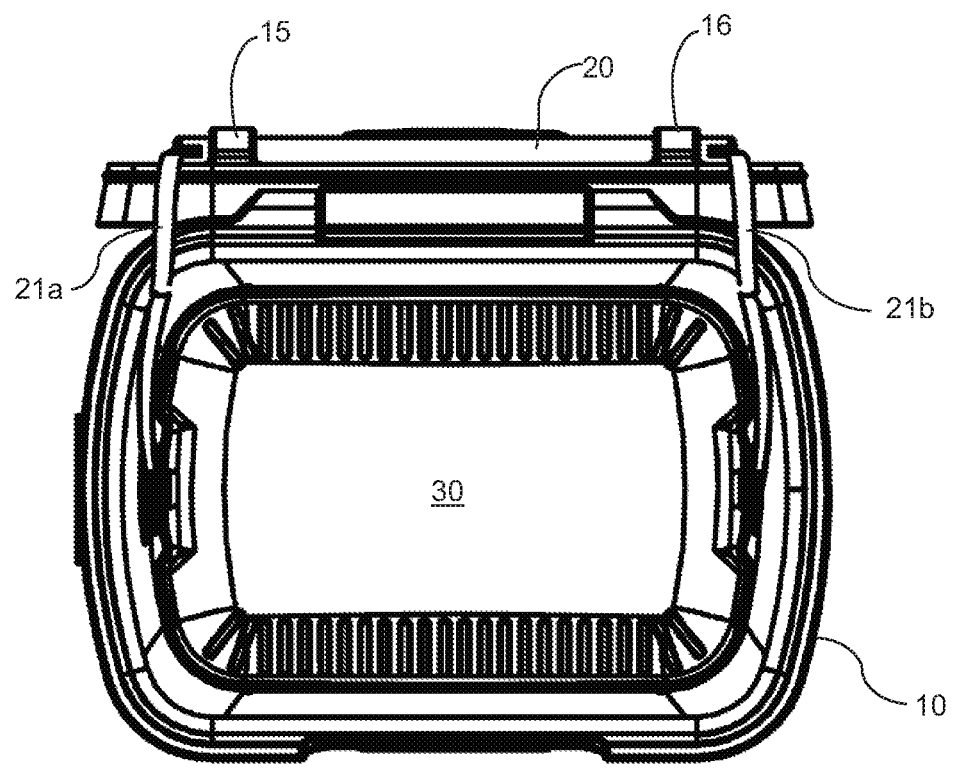
FIG. 4 is a top plan view of a preferred herb keeper, shown with a lid in an open position.
Figure 5:
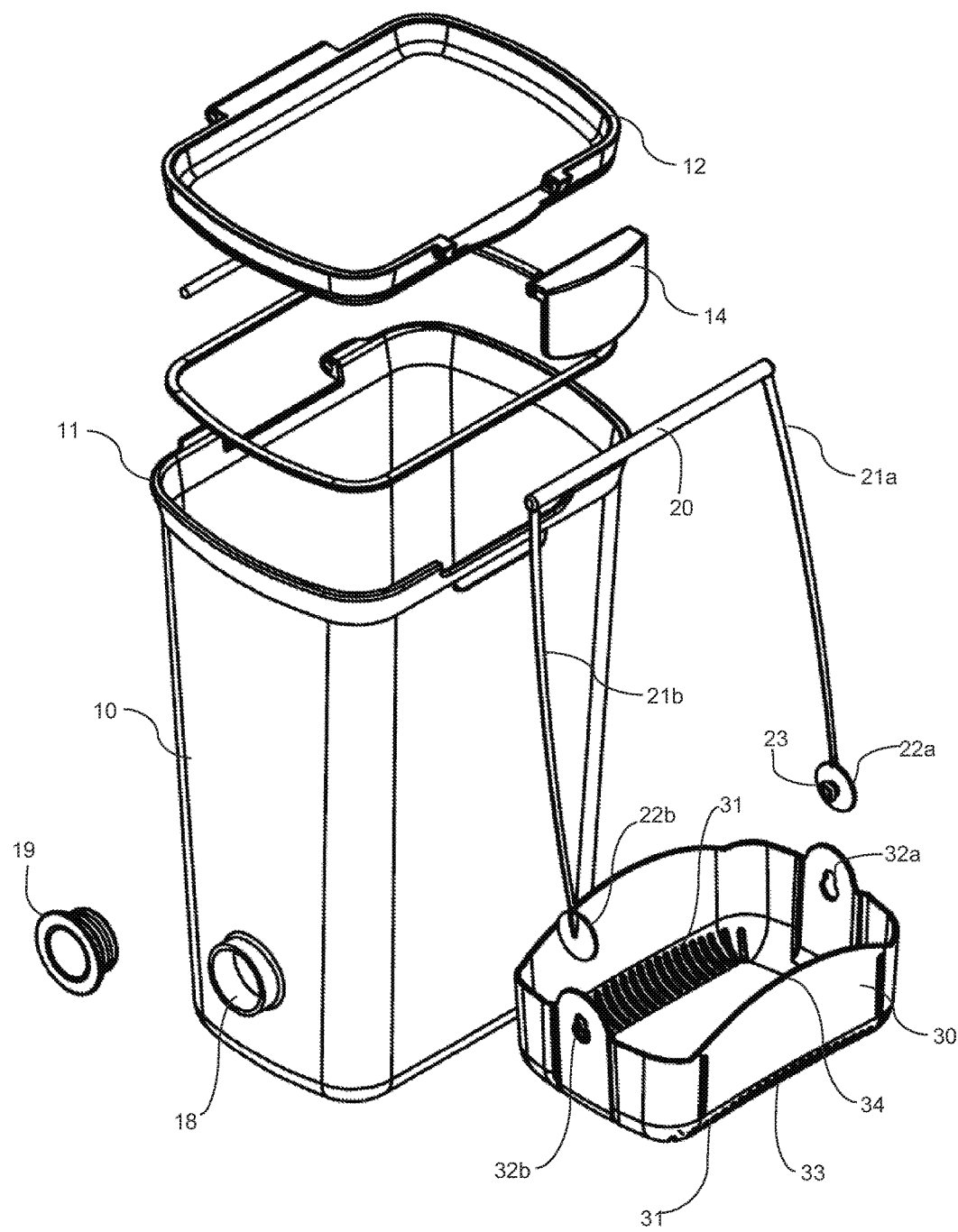
FIG. 5 is an exploded view of a preferred herb keeper.

A strap or pair of straps 21a, 21b attaches to each side of the bar, and is configured to be a flexible strap which extends into the container and supports a basket 30, shown in FIGS. 4 and 5. The basket has a height from the base 33 of the basket to the basket rim 34, in which the basket height is much shorter than the height of the container from the container base to the container rim, and which is preferably formed with a plurality of through-holes 31 to allow water to freely travel into or out of the basket.

Each of the straps 21 terminates in a mount 22a, 22b having a boss 23, the boss being configured to slide into a grommet hole 32a, 32b positioned at either side of the basket. The boss is removably attachable to the basket so that, when attached, the straps will support the basket within the container to allow the basket to be lifted by the straps. In other versions the strap may be attached differently, such as with clips, rings, or other structures.

The container further includes a drain or through-hole 18 formed in a sidewall and above the base of the container. A water plug 19 is removably positionable in the through-hole to seal the through-hole. The through-hole allows water to be drained from the container, adding water to the top and draining it from the location toward the bottom. In one version, the height of the through-hole is at a level equal to the top of the basket when the basket is positioned in the container. Most preferably, the through hole is at least an inch from the bottom of the container.

When the lid is closed, the strap attaches to the basket and is of a length at which the basket rests on the interior floor of the container. Most preferably at this position in which the lid is closed there is no slack in the straps, but there likewise is little or no stress on the straps. When the lid is opened, the pivotal movement of the lid pulls the strap along with it, and therefore raises the basket. Most preferably, the fasteners are positioned so that the basket at least raises fully above the location of the through-hole, to position the basket above what would be intended to be a water line. In various uses, however, the container may be used with or without water. Most preferably, the opening of the lid raises the basket to a degree that allows a user to gain easier access to the herbs or similar items that may be contained by and supported within the basket, thereby allowing the herbs to be stored at a lower level within the water but raised for easier access.

In use, fresh herbs can be placed in the basket, which is raised while the lid is open. Water can be added to the basket as desired, or the herbs may be rinsed while the basket is raised, allowing water to flow out the through hole. All or a portion of the water may be drained from the container, and the drain plug inserted. The lid can then be closed, automatically lowering the basket along with the lowering of the straps. The user may access the herbs at any time by opening the lid, which will automatically raise the basket to allow easy access.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

We claim:

1. An herb keeper, comprising:
   a container having a floor and upwardly extending sidewalls forming an interior space, the sidewalls terminating in an upper rim;
   a lid removably attached to the upper rim of the container and movable between a closed position which encloses the interior space, and an open position moved away from the upper rim, the lid having an interior side and an exterior side;
   a basket configured to fit within the container; and
   a flexible strap having a first end attached to the interior side of the lid and a second end attached to the basket.

2. The herb keeper of claim 1, wherein the lid is pivotally attached to the container for pivotal movement between the closed position and the open position in which the lid is pivoted away from the container.

3. The herb keeper of claim 2, further comprising a clasp for retaining the lid in the closed position.

4. The herb keeper of claim 2, wherein the strap comprises a first strap and a second strap, the first strap having a first end attached to the interior side of the lid and a second end attached to the basket, and the second strap having a first end attached to the interior side of the lid and a second end attached to the basket.

5. The herb keeper of claim 4, further comprising a bar attached to the interior side of the lid, each of the first strap and the second strap being attached to the bar.

6. The herb keeper of claim 5, further comprising a fastener attached to the interior side of the lid, the fastener removably attaching the bar to the interior side of the lid.

7. The herb keeper of claim 4, further comprising:
   a first mount and a first boss attached to the first strap;
   a second mount and a second boss attached to the second strap;
   a first grommet and a second grommet positioned on the basket, the first boss being attached to the first grommet and the second boss being attached to the second grommet.

8. The herb keeper of claim 2, further comprising a drain hole positioned adjacent the floor of the container, and a drain plug removably sealing the drain hole.

9. The herb keeper of claim 2, further comprising a hinge, wherein the lid is pivotally attached to the container by the hinge.

10. The herb keeper of claim 9, wherein the strap is attached to the lid adjacent the hinge.

\* \* \* \* \*